United States Patent Office 3,501,435
Patented Mar. 17, 1970

3,501,435
PROCESS FOR CURING POLYCARBORANYLENE-
SILOXANES
Trescott B. Larchar, Sr., Hamden, Theodore L. Heying,
North Haven, and Stelvio Papetti, Hamden, Conn., assignors to Olin Mathieson Chemical Corporation, a
corporation of Virginia
No Drawing. Filed Nov. 28, 1967, Ser. No. 686,302
Int. Cl. C08g 51/04; C08k 1/02
U.S. Cl. 260—37                7 Claims

ABSTRACT OF THE DISCLOSURE

Polycarboranylenesiloxanes comprising repeating units having the formula

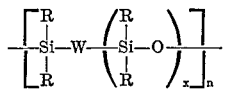

wherein W is a p-carboranyl or m-carboranyl moiety, each R is an independently selected alkyl or aryl, $x$ is an integer from 2 to 4 and $n$ is an integar greater than 1;
said polycarboranylenesiloxane containing from 0 to 10 mole percent of a vinyl-containing unit having the formula

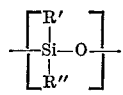

wherein R' is hydrogen, alkyl, aryl, vinyl or a vinyl-containing moiety and R'' is vinyl or a vinyl-containing moiety;
are cured according to the process of this invention by heating at atmospheric pressure at a temperature greater than about 150° C. A metal oxide anti-oxidant and/or an inorganic filler can be admixed with the polycarboranylenesiloxane prior to curing. The cured compositions are useful in the fabrication of gaskets, O-rings, bushings, etc. for applications where high temperature resistance is required.

Description of the invention

This invention relates to a process for curing polycarboranylenesiloxanes, and more particularly to a process for curing polycarboranylenesiloxanes comprising repeating units having the formula

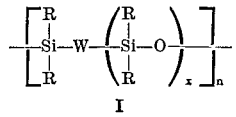
I wherein each R is an independently selected alkyl or aryl, W is a m-carborane or p-carborane moiety and $x$ is an integer from 2 to 4. This invention also relates to a process for curing polycarboranylenesiloxanes I containing randomly dispersed units having the formula

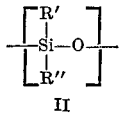
II wherein R' is hydrogen, alkyl, aryl, vinyl or a vinyl-containing moiety and R'' is vinyl or a vinyl-containing moiety.

The polycarboranylenesiloxanes have been previously cured by peroxide vulcanization under pressure at temperatures around the decomposition point of the particular peroxide catalyst employed as a free-radical initiator. Thus, H. Schroeder et al. in Rubber Chemistry and Technology, vol. 39, No. 4, Part 2, 1184–1199 (September 1966) describe molding various poly-m-carboranylenesiloxanes into panels and curing at 150–160° C. for 1–2 hours with an initial pressure of 200 p.s.i. A post-cure cycle consisting of one day each at ambient temperature, 100° C., 150° C. and 250° C. is then followed to obtain the desired cured polymeric product.

Now it has been found that polycarboranylenesiloxanes can be cross-linked in the absence of a catalyst by heating at a temperature of at least about 150° C. to provide cured compositions having greater tensile strength and improved physical properties with respect to the uncured polymers. Furthermore, the process of this invention is carried out at atmospheric pressure thereby obviating the necessity of employing costly pressure equipment. Curing times are short and no lengthy post-cure period is required.

This process is particularly surprising in view of the fact that silicon-containing polymers are cured by peroxide catalyzed reactions. Thus, for example, in the Vulcanization of Elastomers, Reinhold Publishing Corportion (New York) 1964, pages 366–399, P. G. Bork and C. W. Roush discuss at length the mechanism and reaction conditions for free radical-initiated curing of silicone rubber.

The polycarboranylenesiloxanes I which can be cured known processes, for example, as disclosed by S. Papetti et al. in J. Polymer Science (A–1) 4, 1623–1636 (1966). Thus, polycarboranylenesiloxanes I where $x$ is 2 are provided by the ferric chloride catalyzed condensation of a bis[alkoxydialkyl(or diaryl)silyl]carbonane with a dihalodialkyl(or diaryl)silane in accordance with the following equation where X is halogen and R and W are are previously described.

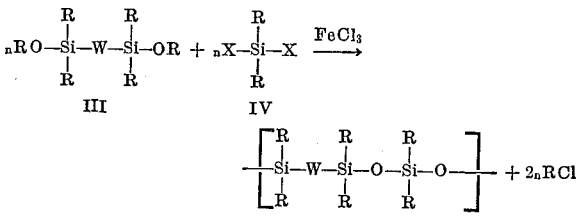

Bis[alkoxydialkyl(or diaryl)silyl]carboranes having the Formula III are readily provided according to the process described by S. Pepetti et al. in Inorg. Chem. 3, 1448 (1964) for the preparation of 1,7-bis(methoxydimethylsilyl)-m-carborane. Thus, m-carborane or p-carborane is first reacted with an alkali metal alkyl or alkali metal aryl to provide dialkali metal m-carborane or dialkali metal p-carborane. The dialkali metal carborane is then reacted with an appropriate dialkyldihalosilane or diaryldihalosilane to provide a bis[halodialkyl(or diaryl)silyl]carborane. Reaction of the bis[halodialkyl(or diaryl) silyl]carborane with an alcohol such as methanol, ethanol, n-propanol, n-butanol, etc. provides the desired bis[alkoxydialkyl(or diaryl)silyl]carborane. Generally the latter reaction is carried out at a temperature between about −10° C. to about +175° C. and optionally an inert solvent can be employed.

Illustrative bis[alkoxydialkyl(or diaryl)silyl]carboranes III which can be employed in the preparation of the polycarboranylenesiloxanes I where X is 2 include 1,12-bis(methoxydimethylsilyl)-m-carborane;
1,12-bis(methoxydiethylsilyl)-m-carborane;
1,12-bis(methoxymethylethylsilyl)-m-carborane;
1,12-bis(ethoxydipropylsilyl)-m-carborane;
1,12-bis(ethoxydimethylsilyl)-m-carborane;
1,12-bis(ethoxyethylisopropylsilyl)-m-carborane;
1,12-bis(n-butoxydimethylsilyl)-m-carborane;
1,12-bis(methoxydi-n-butylsilyl)-m-carborane;
1,12-bis(methoxydi-n-hexylsilyl)-m-carborane;
1,12-bis(methoxydiphenylsilyl)-m-carborane;
1,12-bis(methoxyditolylsilyl)-m-carborane;
1,12-bis(methoxydixylylsilyl)-m-carborane;

the corresponding 1,7-bis[alkoxydialkyl(or diaryl)silyl]-p-carboranes; and the like.

Dihalodialkyl(or diaryl)silanes suitable for use in the previously described reaction with the bis[alkoxydialkyl(or diaryl)silyl]carboranes include dimethyldichlorosilane, diethyldichlorosilane, ethylmethyldichlorosilane, diamyldichlorosilane, dihexyldichlorosilane, diphenyldichlorosilane, ditolyldichlorosilane, dixylyldichlorosilane, etc.

Polycarboranylenesiloxanes having the Formula I where $x$ is 3 are provided by reacting a tetraalkyl(or tetraaryl)dihalodisiloxane with one of the previously described bis[alkoxydialkyl(or diaryl)silyl]carboranes III in accordance with the following equation where R, W, and X are as previously described.

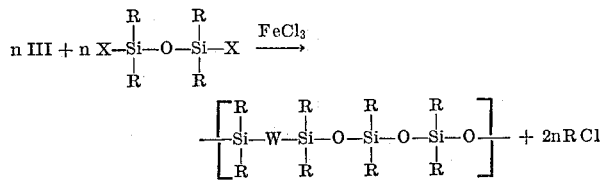

Suitable tetraalkyl(or tetraaryl)dihalodisiloxanes include tetramethyldichlorodisiloxane, dimethyldi-n-propyldichlorodisiloxane, tetra-n-propyldichlorodisiloxane, tetraphenyldichlorodisiloxane, diethyldiphenyldichlorodisiloxane, dimethylditolyldichlorodisiloxane, etc.

Polycarboranylenesiloxanes I where X is 4 are provided by the ferric chloride catalyzed condensation of a bis[tetraalkyl(or tetraaryl)halodisiloxanyl]carborane with a dialkoxydialkyl(or diaryl)silane in accordance with the following equation where R, W, and X are as previously described.

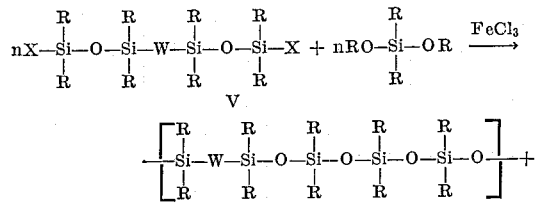

Bis[tetraalkyl(or tetraaryl)halodisiloxanyl]carboranes having the Formula V are provided by reacting a dialkali metal carborane with a 1,1,3,3-tetraalkyl(or tetraaryl)-1,3-dihalodisiloxane. Illustrative of suitable bis[tetraalkyl(or tetraaryl)halodisiloxanyl]carboranes which can be employed include bis(1,1,3,3-tetramethyl-3-chlorodisiloxanyl)-m-carborane;
bis(1-ethyl-1-methyl-3,3-dipropyl-3-chlorodisiloxanyl)-m-carborane;
bis(1,1,3,3-tetraethyl-3-chlorodisiloxanyl)-m-carborane;
bis(1,1-diethyl-3,3-dipentyl-3-chlorodisiloxanyl)-m-carborane;
bis(1,1,3,3-tetrapropyl-3-chlorodisiloxanyl)-m-carborane;
bis(1,1,3-triisopropyl-3-hexyl-3-chlorodisiloxanyl)-m-carborane;
bis(1,1,3,3-tetrabutyl-3-chlorodisiloxanyl)-m-carborane;
bis(1,1,3,3-tetrapentyl-3-chlorodisiloxanyl)-m-carborane;
bis(1,1,3,3-tetraphenyl-3-chlorodisiloxanyl)-m-carborane;
bis(1,1,3-trimethyl-3-xylyl-3-chlorodisiloxanyl)-m-carborane; etc.

Exemplificative dialkoxydialkyl(or diaryl)silanes suitable for use in the preparation of polycarboranylenesiloxanes I where $x$ is 4 are dimethoxydimethylsilane, dimethoxymethylethylsilane, diethoxydimethylsilane, diethoxydiethylsilane, diethoxyethylisopropylsilane, dipropoxydimethylsilane, diisopropoxydimethylsilane, dipropoxydiethylsilane, dibutoxydimethylsilane, dibutoxydiethylsilane, dibutoxydipropylsilane, diisobutoxydibutylsilane, diethoxydipentylsilane, dipropoxydipentylsilane, dipropoxymethylpentylsilane, dipropoxydihexylsilane, dimethoxydiphenylsilane, dibutoxydiphenylsilane, diisopropoxydiphenylsilane, dipropoxyditolylsilane, dibutoxyditolylsilane, dihexoxyditolylsilane, diethoxydixylylsilane, dipropoxydixylylsilane, diisopropoxydixylylsilane and dibutoxydixylylsilane.

While any of the previously described polycarboranylenesiloxanes can be cured according to the process of this invention, preferred embodiments employ those polycarboranylenesiloxanes having the Formula I where R is an independently selected lower alkyl, i.e., alkyl having 1–4 carbon atoms, or phenyl.

The previously described reactions provide polycarboranylenesiloxanes comprising repeating units having the Formula I; units having the Formula II can be randomly incorporated into the polycarboranylenesiloxane I backbone by employing as a coreactant a compound having the formula

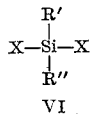

VI wherein R' and R'' are as previously described and X is halogen, i.e., fluorine, chlorine, bromine or iodine. Illustrative compounds having the Formula VI are dichloro-(1-vinylcarboran-2-yl)methylsilane, methylvinyldichlorosilane, divinyldichlorosilane, methylallyldichlorosilane, ethylallyldichlorosilane, n-propylallyldichlorosilane, ethylisopropenyldichlorosilane, diallyldichlorosilane. Particularly preferred are those compounds VI wherein R' is lower alkyl, i.e., alkyl having 1 to 4 carbon atoms, or phenyl and R'' is vinyl or 1-vinylcarbon-2-yl.

Generally up to about 10 mole percent of units II are incorporated into the polycarbonaylenesiloxane I by substituting a compound having the Formula VI for part of the dihalo reactant in the previously described processes. While the incorporation of units having the Formula II in the polycarboranylenesiloxane I aids in the curing process, curing is readily accomplished without the presence of such units.

The polycarboranylenesiloxanes which are cured according to the process of this invention have molecular weights of up to about 200,000 and even greater; but polycarboranylenesiloxanes having molecular weights of at least 2,000 are preferred.

The ferric chloride employed as the catalyst in the preparation of the polycarboranylenesiloxanes of this invention may be used in its anhydrous form or any of its various hydrated forms, e.g., $FeCl_3 \cdot 6H_2O$; mixtures of hydrated and anhydrous ferric chloride can also be suitably employed. The amount of catalyst can be varied from about 0.01 to about 10 mole percent based on the total number of moles of reactants employed, but preferably from about 0.05 to about 3.0 mole percent is employed.

The preparation of the polycarboranylenesiloxanes is generally carried out at a temperature from about 75° to about 250° C. and preferably from about 90° to about 125° C. If the rate of reaction, as measured by the evolution of gaseous alkyl chloride by-product, decreases prior to completion of the reaction, addition catalyst can be added and/or the temperature increased. Elimination of the ferric chloride catalyst from the polymeric products is accomplished by washing with acetone or a mixture of acetone and concentrated hydrochloric acid.

The polycarboranylenesiloxanes are cross-linked preferably in admixture with a metal oxide anti-oxidant. While the presence of the metal oxide anti-oxidant is not a necessary feature of this invention, it does prevent oxidative attack of the cured composition during extended exposure at elevated temperatures. Preferably from 1.5 to 20 parts of metal oxide are employed per 100 parts of polymer. Illustrative metal oxide anti-oxidants include ferric oxide, silver oxide, magnesium oxide, titanium dioxide, zinc oxide, aluminum oxide, cesium oxide, tungsten trioxide, cobalt oxide, nickel oxide, zirconium oxide, lead oxide, tin oxide, etc. Various other anti-oxidants, such as ferrocene, can also be suitably employed.

An inorganic filler can be admixed with the polycarboranylenesiloxane and anti-oxidant to improve the strength of the cured composition. Exemplificative inorganic fillers include various silicas, e.g., silicas having particle sizes of from about .010 up to abou 15 microns and even greater, silicates, aluminum oxide, titanium dioxide, calcium carbonate, carbon black, clay, oxides of lead alumina and zinc, glass fiber, talc, asbestos, etc. Some of the aforementioned fillers also function as anti-oxidants, and thus can be employed to fulfill a dual function, either alone or in admixture with other anti-oxidants and fillers. The amount of filler utilized can vary up to about 100 parts per 100 parts of uncured polymer, but preferably from about 25 to 50.0 parts is employed. While the use of such a filler is desirable in many applications, it is not essential to the practice of this invention.

The curable compositions are prepared by conventional methods such as milling and like and the resulting admixture is then heated at temperatures of at least about 150° C. according to the process of this invention. While any temperature of at least about 150° C. can be employed in the heat curing process of this invention, temperatures up to about 500° C. and preferably from about 300° C. up to about 400° C. are generally employed.

While it is apparent that some degree of cross-linking occurs during the preparation of the polycarboranylenesiloxanes, the process of this invention is employed to modify the physical properties of the polymer. Thus, the polycarboranylenesiloxane to be cross-linked generally has a tensile strength less than 20 p.s.i., although tensile strengths up to about 150 p.s.i. have been measured for admixtures of polycarboranylenesiloxanes with inorganic fillers. The cured product however, has tensile strengths ranigng from about 50 to about 600 p.s.i., and generally above 200 p.s.i. Similarly, the elongation, tackiness, dimensional stability and the like are improved by curing according to this invention.

The cured compositions provided according to the process of this invention are useful as gaskets, O-rings, bushings, etc. in applications where high temperature-resistance is required, e.g., aircraft, motors and the like.

The following examples will serve to illustrate the curing of various polycarboranylenesiloxanes I according to the process of this invention. In the examples, tensile strength and percent elongation were determined according to ASTM D–882–56T and Shore-A Hardness in accordance with ASTM D–2240–64T.

EXAMPLE 1

A. Preparation of polymer 1,7-bis(methoxydimethylsilyl)-m-carborane (146.0620 g.), dichlorodimethylsilane (58.6543 g.) and anhydrous ferric chloride (0.75 g.) were mixed in a 500 ml. single-necked flask which was equipped with a stirring bar and a nitrogen inlet line for flushing the apparatus. The reaction flask was also connected to a vacuum line having a bubble-off and an outlet for sampling volatile products. A wet-test meter was connected to the bubble-off to measure methyl chloride evolution. The flask was placed on an oil bath and heat was applied. After approximately one hour, the reaction stopped as evidenced by the cessation of gas evolution; at this time the temperature of the oil bath was 127° C. A second portion of ferric chloride catalyst (0.75 g.) was added and the reaction mixture heated at an oil bath temperature ranging from 155° C. up to 190° C. until the reaction was completed. An elastic, rubbery material was thus obtained. Elimination of ferric chloride from the product was accomplished by washing with acetone and finally with a 10 percent water solution in acetone. The infrared spectrum of a sample of the dried product was in accord with that expected from a polymer having recurring units of the formula

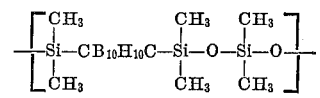

B. Curing of the polymer

The amount of 10.0 g. of the poly-m-carboranylenesiloxane prepared according to part A was mixed with 3.75 g. of fumed silica having an average particle size of about .012$\mu$ and 0.72 g. of ferric oxide on a two-roll mill to provide a sheet having a thickness of 15 mils. The resulting filled polymer compositions were divided into samples which were cured at 315° C. for various times. The Shore A Hardness of the cured compositions were as follows:

| Cure time, min. | Shore A Hardness |
|---|---|
| 0 | No reading |
| 1 | 70–71 |
| 2 | 70–74 |
| 30 | 70 |

A tensile strength of 3 p.s.i. and an elongation of less than 20 percent were measured on a sample of the uncured composition.

EXAMPLE 2

A filled poly-m-carboranylenesiloxane composition was prepared as described in Example 1 with the exception that 0.5 g. of ferric oxide was employed. The milled sheet was cut into samples and cured at 315° C. for various time intervals. Physical properties of the cured compositions are set forth below:

| Cure Time, sec. | Tensile Strength, p.s.i. | Percent Elongation |
|---|---|---|
| 0 | 55 | 200 |
| 15 | 240 | 94 |
| 30 | 236 | 101 |
| 45 | 234 | 117 |

EXAMPLE 3

Following the procedure of the previous examples, a filled polymer composition consisting of 10.0 g. of the poly-m-carboranylenesiloxane described in Example 1, 4.5 g. of fumed silica and 2 g. of ferric oxide was mixed on a farm mill to provide a smooth sheet having a thickness of 50 mils. After curing for various periods of time at 325° C., the following physical properties were determined. These data reflect the effect of various cure times on a composition containing a greater proportion of filler than those described in the previous examples.

| Cure Time | Tensile, p.s.i. | Elongation, percent |
| --- | --- | --- |
| 0 | 85 | 330 |
| 1 min | 205 | 27 |
| 5 min | 313 | 37 |
| 30 min | 373 | 37 |
| 1 hour | 276 | 24 |
| 24 hours | 380 | 17 |

EXAMPLE 4

A. Preparation of polymer

Following the procedure set forth in Example 1, part A, 1,7-bis(methoxydimethylsilyl)-m-carborane (110.6605 g.), dichlorodimethylsilane (44.3837 g.), dichloro(1-vinyl-carboran-2-yl)methylsilane (0.2919 g.) and anhydrous ferric chloride (1.12 g. total) were reacted to provide a light brown, dry elastomeric product. A final oil bath temperature of 184° C. was observed. Infrared analysis confirmed that the product consisted of recurring units having the following formulas

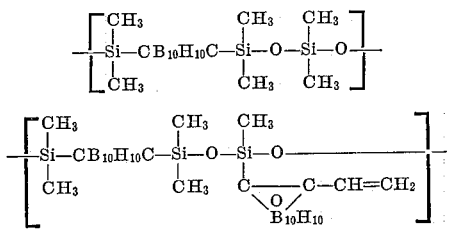

B. Curing the polymer

A portion of the poly-m-carboranylenesiloxane described in part A (7.5 g.) was mill mixed with fumed silica (2.85 g.) and ferric oxide (0.5472 g.) to form a sheet having a thickness of about 15 mils. Small portions of the sheet were cured at various temperatures. The curing data and results are set forth below.

| Time | Temperature (±5° C.) | Results |
| --- | --- | --- |
| 1 min | 425 | Flexible piece, hard outside. |
| 30 sec | 425 | Flexible, not quite as hard. |
| 20 sec | 425 | Flexible, rubbery piece. |
| 2 min | 371 | Flexible but hard. |
| 1 min | 371 | Good but a little stiff. |
| 30 sec | 371 | Excellent, flexible rubbery piece. |
| 2 min | 315 | Good cure, Shore A Hardness 75. |
| 1 min | 315 | Good cure, Shore A Hardness 71. |
| 30 sec | 315 | Good cure, Shore A Hardness 66. |

EXAMPLE 5

Example 2 was repeated employing the polymer described in Example 4, part 4, part A as the poly-m-carboranylenesiloxane. The physical properties of the cured compositions are as follows:

| Cure Time | Tensile, p.s.i. | Elongation, percent |
| --- | --- | --- |
| 0 sec | 3 | <20 |
| 15 sec | 248 | 135 |
| 30 sec | 251 | 126 |
| 45 sec | 305 | 127 |

EXAMPLE 6

A. Preparation of polymer

Following the procedure of Example 1, part A, 1,7-bis-chlorotetramethyldisiloxanyl)-m-carborane (53.7880 g.), diphenyl dimethoxysilane (26.1040 g.) and 0.72 g. total of a 1:1 mixture of anhydrous ferric chloride and hydrated ferric chloride ($FeCl_3 \cdot 6H_2O$) were reacted to provide a dark brown gummy product. The product was slurried with approximately 1.5 liters of ether and then washed with 10 percent hydrochloric acid and finally with water. After evaporation of the ether in vacuo, the product was heated for a short time at a temperature ranging up to 200° C. to provide a dry elastomeric product.

The infrared spectrum was in accord with a polymer consisting or recurring units having the formula

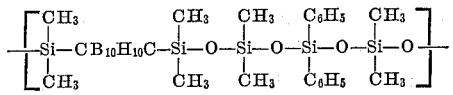

B. Curing of polymer

A 10 g. portion of the poly-m-carboranylenesiloxane described in part A was mill mixed with 3.75 g. of fumed silica and 0.50 g. of ferric oxide to provide a smooth sheet having a thickness of 16 mils. Samples of this sheet were cured at 315° C. for various time intervals. Physical properties of the cured compositions are as follows:

| Cure Time (sec.) | Tensile Strength, p.s.i. | Elongation, percent |
| --- | --- | --- |
| 0 | 0 | >100 |
| 15 | 77 | 90 |
| 30 | 80 | 91 |

EXAMPLE 7

A. Preparation of the polymer

A mixture of 1,7 - bis(methoxydimethylsilyl)-m-carborane (0.573 mole, 183.7 g.), dichloro(1-vinylcarboran-2-yl)methylsilane (0.5 g.), diphenyldichlorosilane (144.6 g.) and anhydrous ferrice chloride (0.93 g.) was gradually heated with vigorous stirring to 180° C. over a two hour period. The resulting viscous liquid was dissolved in ether and washed first with dilute hydrochloric acid and then several times with water. The ethereal layer was dried, the solvent evaporated and the resulting viscous liquid heated in vacuo at 230° C. to remove non-polymeric by-products. The molecular weight of the product was determined to be 2508 (in o-dichlorobenzene at 100° C. using a vapor pressure osmometer). Infrared analysis revealed that the polymer consisted of recurring units having the formulas:

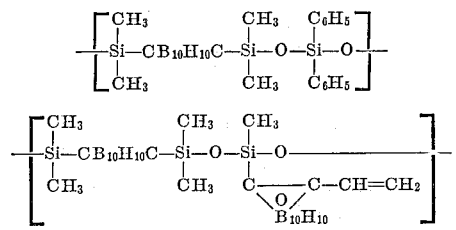

B. Curing the polymer

One hundred parts of the polymer described in part A were dissolved in 50 parts of toluene. Thirty-five parts of silica having a particle size of 5 microns and 5 parts of ferric oxide were mixed into the polymer solution, which was then spread on a glass plate and air dried to a thickness of 5–6 mils. Curing was effected by heating at 370° C. for ten minutes. The following physical properties were determined.

| Cure Time | Tensile, p.s.i. | Elongation, percent |
| --- | --- | --- |
| 0 | Tacky film, no strength | |
| 10 | 800 | 10 |

EXAMPLE 8

Xylene (50 parts) was added to one hundred parts of the poly-m-carboranylenesiloxane described in Example 7 and the resulting mixture agitated until solution was effected. One hundred parts of titanium dioxide were added and stirring was continued until a smooth dispersion was obtained. This polymer dispersion was applied to a stainless steel plate, air dried and then heated at 160° C. for fifteen minutes to obtain a hard, flexible coating.

What is claimed is:

1. A non-catalytic process for cross-linking a curable composition comprising a polycarboranylenesiloxane which contains repeating units having the formula

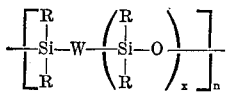

wherein W is a p-carboranyl or m-carboranyl moiety, each R is an independently selected lower alkyl or phenyl, X is an integer from 2 to 4 and $n$ is an integer greater than 1; said polycarboranylenesiloxane containing from 0 to about 10 mole percent of a vinyl-containing unit having the formula

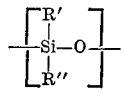

wherein R' is a lower alkyl or phenyl and R" is a vinyl or 1-vinylcarboran-2-yl; which process comprises heating said curable composition at atmospheric pressure and a temperature greater than about 150° C.

2. The process of claim 1 wherein the said polycarboranylenesiloxane has a molecular weight of at least about 2,000 and the said curable composition also comprises
   (a) a mental oxide anti-oxidant in an amount between 0 and 20 parts per 100 parts of said polycarboranylenesiloxane; and
   (b) an inorganic filler in an amount from 0 to 100 parts per 100 parts of said polycarboranylenesiloxane.

3. The process of claim 2 wherein a temperature greater than about 300° C. up to about 400° C. is employed.

4. The process of claim 3 wherein W is a m-carborane moiety, $x$ is 2 and the metal oxide is ferric oxide.

5. The process of claim 4 wherein R is methyl and the filler is silica.

6. The process of claim 3 wherein W is a m-carborane moiety, $x$ is 4 and the metal oxide is ferric oxide.

7. The process of claim 6 wherein R is an independently selected methyl or phenyl and the filler is silica.

References Cited

UNITED STATES PATENTS

| | | | |
|---|---|---|---|
| 3,388,090 | 6/1968 | Heying et al. | 260—37 |
| 3,388,091 | 6/1968 | Heying et al. | 260—37 |
| 3,388,092 | 6/1968 | Heying et al. | 260—37 |
| 3,388,093 | 6/1968 | Heying et al. | 260—37 |

MORRIS LIEBMAN, Primary Examiner

L. T. JACO, Assistant Examiner

U.S. Cl. X.R.

260—46.5